United States Patent
Krotosky et al.

(10) Patent No.: US 11,615,654 B1
(45) Date of Patent: Mar. 28, 2023

(54) SIGNATURE USE FOR EFFICIENT DATA TRANSFER

(71) Applicant: Lytx, Inc., San Diego, CA (US)

(72) Inventors: Stephen Krotosky, San Diego, CA (US); Jeremiah Todd Wittevrongel, San Diego, CA (US); Jesse Daniels, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 666 days.

(21) Appl. No.: 16/663,152

(22) Filed: Oct. 24, 2019

(51) Int. Cl.
*G07C 5/00* (2006.01)
*G07C 5/08* (2006.01)
*G06N 3/08* (2023.01)

(52) U.S. Cl.
CPC ............. *G07C 5/0808* (2013.01); *G06N 3/08* (2013.01); *G07C 5/0866* (2013.01)

(58) Field of Classification Search
CPC ....... G07C 5/0808; G07C 5/0866; G06N 3/08
See application file for complete search history.

(56) References Cited

U.S. PATENT DOCUMENTS

| 10,310,773 | B2* | 6/2019 | Huntzicker | G06F 3/0679 |
| 2007/0150138 | A1* | 6/2007 | Plante | G06F 19/00 701/35 |
| 2009/0268947 | A1* | 10/2009 | Schaufler | G06K 9/00 382/104 |
| 2016/0042767 | A1* | 2/2016 | Araya | G11B 27/34 |
| 2018/0158323 | A1* | 6/2018 | Takenaka | G08G 1/0112 |
| 2020/0117912 | A1* | 4/2020 | Thompson | G06K 9/00791 |

* cited by examiner

*Primary Examiner* — Gertrude Arthur Jeanglaude
*Assistant Examiner* — Brittany Renee Peko
(74) *Attorney, Agent, or Firm* — Van Pelt, Yi & James LLP (57) ABSTRACT

A system for identifying data includes an interface and a processor. The interface is configured to receive training data samples associated with interesting events of an interesting event type. The processor is configured to train a model to recognize the interesting events; determine embedded vectors associated with the interesting events; and determine a representative embedded vector associated with the interesting event type.

15 Claims, 7 Drawing Sheets

SIGNATURE USE FOR EFFICIENT DATA TRANSFER

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors—for example, video recorders, audio recorders, accelerometers, gyroscopes, vehicle state sensors, global positioning system (GPS), etc., that report data, which is used to determine the occurrence of an anomalous event. Anomalous event types include accident anomalous events, maneuver anomalous events, location anomalous events, proximity anomalous events, vehicle malfunction anomalous events, driver behavior anomalous events, or any other anomalous event types. After collection, sensor data can be transmitted to an external reviewing system. Transmitting data is an expensive process and must be minimized, particularly when the vehicle is one of a fleet of vehicles recording data with a vehicle event recorder. Minimizing data transmission requires determination on the vehicle event recorder of whether recorded data is interesting, such that an accurate determination can be made of whether the data should be transmitted. Making this determination in a meaningful way can require more processing power than is typically available to the vehicle event recorder, creating a problem where it is difficult to tell which data should be transmitted.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for identifying data comprises an interface configured to receive training data samples associated with interesting events of an interesting event type, and a processor configured to train a model to recognize the interesting events, determine embedded vectors associated with the interesting events, and determine a representative embedded vector associated with the interesting event type.

A system for identifying data comprises a system for reducing the computation power required for determining whether data is interesting. The system for identifying data comprises a system executing on a vehicle data server for determining model data and a representative embedded vector associated with an interesting event type. The vehicle data server receives a set of training data comprising a set of data samples and associated labels indicating whether the data samples comprise interesting data samples. For example, the labels indicate whether the data is associated with an interesting event type. The interesting event type can be one of a plurality of interesting event types handled independently by the system for identifying data, or the interesting event type can be the only interesting event type handled by the system for identifying data. In various embodiments, the interesting event type comprises one or more of: collision with another moving vehicle, reckless driving, talking on the phone while driving, eating while driving, falling asleep while driving, etc. In some embodiments, the set of training data is determined manually—for example, by human reviewers that identify representative data samples for the interesting event type. The vehicle data server trains a model (e.g., a neural network model, a machine learning model, etc.) to identify data associated with the interesting event type using the set of training data. Data samples labeled as interesting are then processed by the trained model and an embedded vector is determined for each data sample by measuring an intermediate state of the model. For example, the embedded vector comprises an intermediate vector output by an early layer of a neural network. The set of embedded vectors (e.g., one embedded vector for each data sample labeled as interesting) are combined using a vector clustering algorithm to determine a representative embedded vector. Model data describing the portion of the trained model used to generate the set of embedded vectors and the representative are then provided by the vehicle data server to a vehicle event recorder.

The vehicle event recorder receives the model data and representative embedded vector and uses the model data to recreate the portion of the model used to generate the embedded vectors. The portion of the model is then used to process data sensor data collected by the vehicle event recorder. The portion of the model receives sensor data and outputs a sensor data associated vector. The sensor data associated vector is compared with the representative embedded vector to determine whether the sensor data comprises sensor data associated with an interesting event type. For example, determining whether the sensor data comprises sensor data associated with an interesting event type comprises determining whether the vector distance between the sensor data associated vector and the representative embedded vector is less than a threshold. In response to determining that the sensor data is associated with an interesting event type, one or more actions are taken. For example, an indication is provided to upload the sensor data, an indication is provided not to upload sensor data, an indication is provided to change a storage sample rate for the sensor data, an indication is provided to change a recording sample rate for the sensor data, an indication is provided to change a stream type for the sensor data, an indication is provided to provide associated data, etc. The system for identifying data improves the computer by creating a model based system for identifying data similar to data labeled as interesting utilizing a minimum amount of processing power. Utilizing the system for identifying data allows data recorded by a vehicle event recorder to be analyzed for the interesting event type and processed accordingly.

Figure 1:
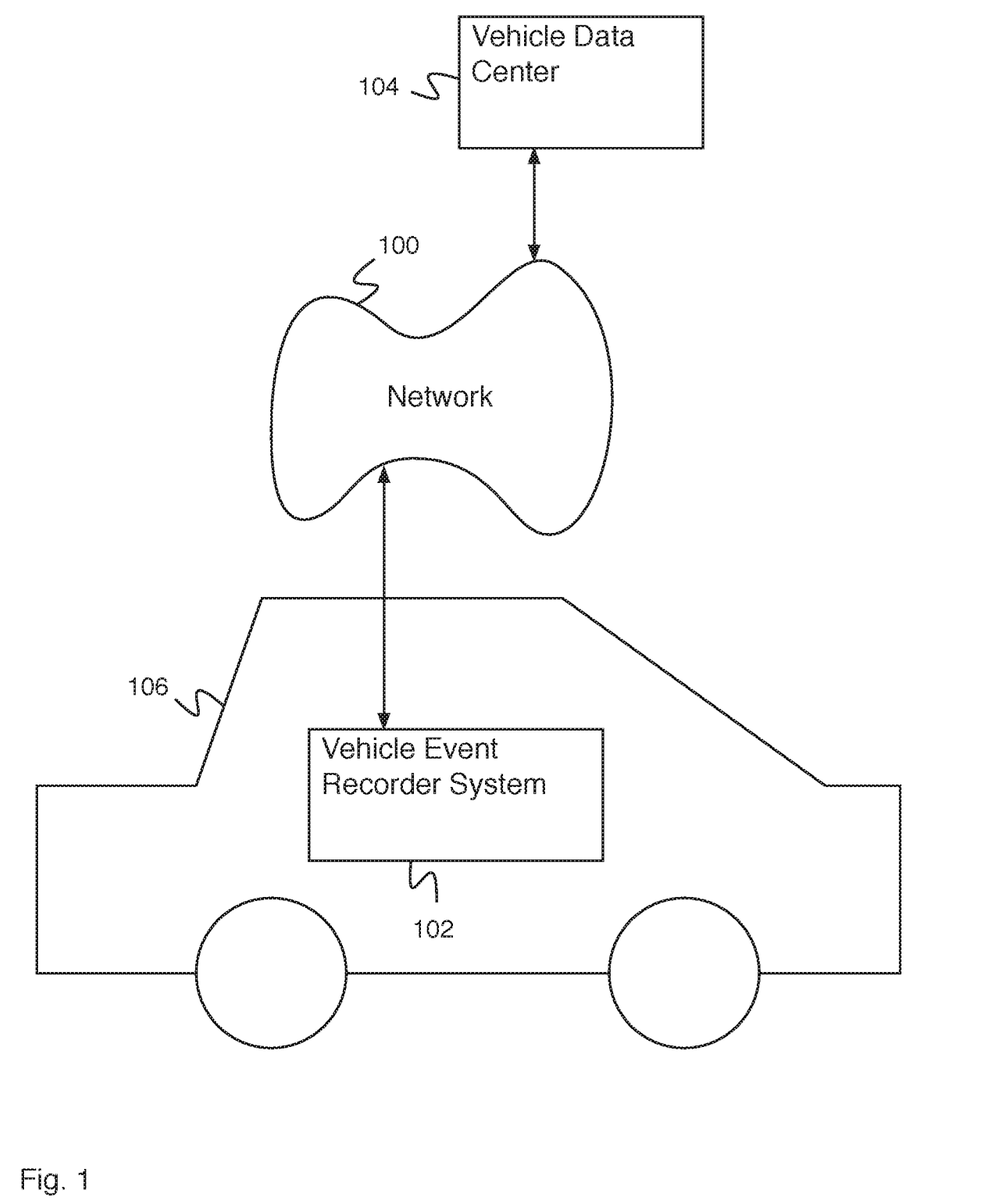
FIG. 1 is a block diagram illustrating an embodiment of a system including a vehicle event recorder.

FIG. 1 is a block diagram illustrating an embodiment of a system including a vehicle event recorder. Vehicle event recorder system 102 comprises a vehicle event recorder mounted in a vehicle (e.g., a car, a truck, a trailer associated with a semi truck, a van, a bus, a commercial vehicle, etc.). Vehicle event recorder system 102 comprises a vehicle event recorder and sensor systems. The sensor systems comprise a set of sensors, for example, one or more video recorders, audio recorders, accelerometers, gyroscopes, vehicle sensors, proximity sensors, a global positioning system (GPS), outdoor temperature sensors, moisture sensors, laser line tracker sensors, sound navigation and ranging systems (SONAR), light detection and ranging systems (LIDAR), range finder sensors, etc. Vehicle sensors comprise internal vehicle sensors—for example, a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. The vehicle event recorder comprises a system for receiving and processing sensor data. In some embodiments, the vehicle event recorder captures data (e.g., collects data, stores received data, marks data in a continuous storage system, etc.) in response to a trigger—for example, a trigger associated with a trigger threshold. Capturing data in response to a trigger comprises receiving data, processing the data, determining to capture more data (e.g., by determining that a processed data value is greater than a threshold), and capturing the more data.

Processing sensor data comprises filtering data, identifying patterns in data, detecting events, etc. Vehicle event recorder system 102 is mounted on vehicle 106 in any appropriate location—for example the chassis, the front grill, the dashboard, the rear-view mirror, the rear window or wall, the floor, etc. There are times when vehicle event recorder system 102 comprises multiple units mounted in different locations within vehicle 106 instead of a single unit, particularly when there are space constraints for a given location (e.g., behind the rear view mirror) and more space is required to house electronic components. Vehicle event recorder system 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder system 102 communicates with vehicle data center 104 via network 100. Vehicle data center 104 receives data, processes data, stores data, requests more data, provides stored data, etc.

For example, vehicle data center 104 comprises a system comprising an interface configured to receive training data samples associated with interesting events of an interesting event type, and a processor configured to train a model to recognize the interesting events, determine embedded vectors associated with the interesting events, and determine a representative embedded vector associated with the interesting event type.

Figure 2:
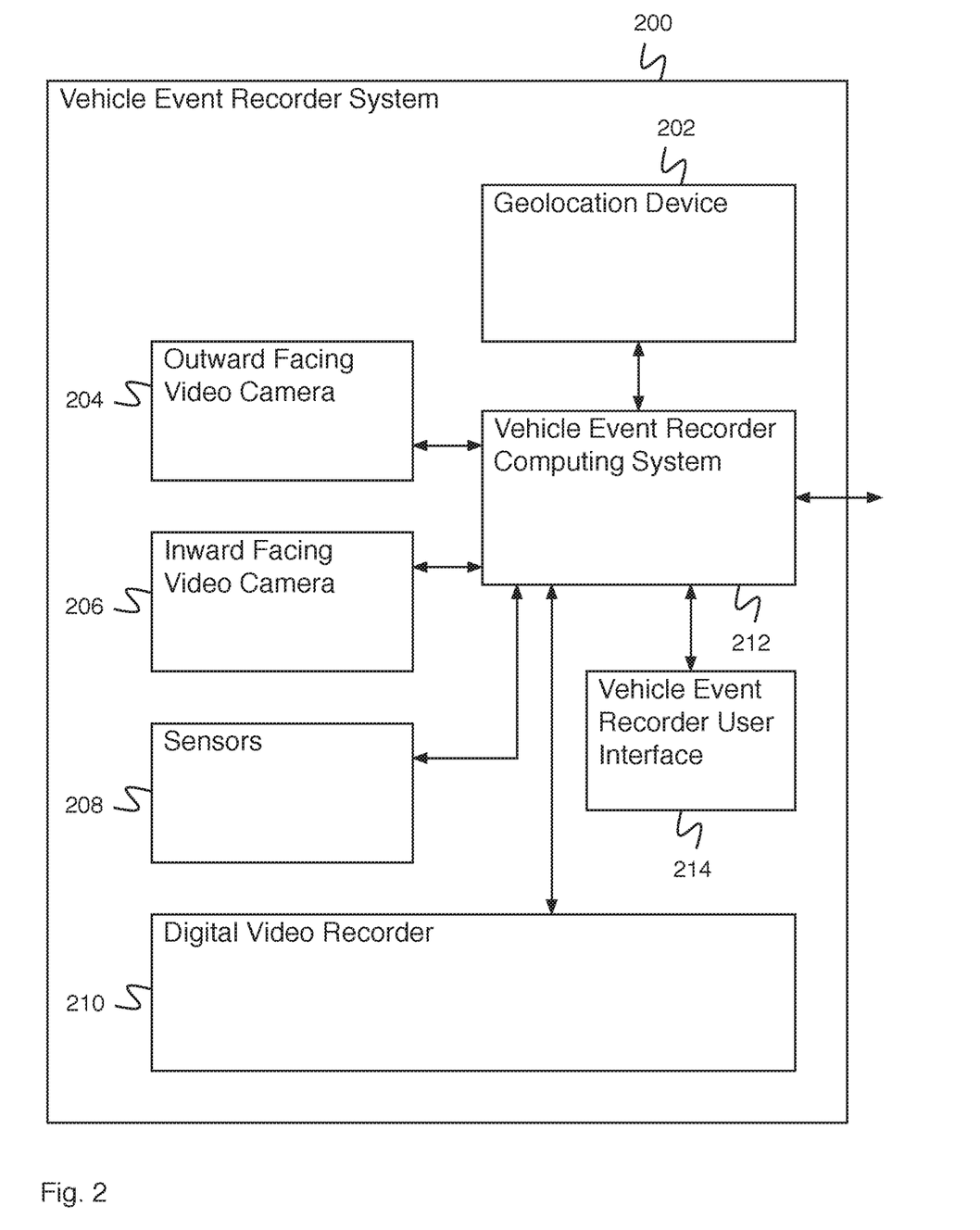
FIG. 2 is a block diagram illustrating an embodiment of a vehicle event recorder system.

FIG. 2 is a block diagram illustrating an embodiment of a vehicle event recorder system. In some embodiments, vehicle event recorder system 200 comprises vehicle event recorder system 102 of FIG. 1. In the example shown, vehicle event recorder system 200 comprises vehicle event recorder computing system 212 (e.g., a computing system for receiving data, processing data, providing interface data, communicating via a network, etc.). For example, vehicle event recorder computing system 212 comprises a system for determining whether sensor data comprises sensor data associated with an interesting event type. Vehicle event recorder system 200 additionally comprises geolocation device 202. For example, geolocation device 202 comprises a GPS device. Vehicle event recorder system 200 additionally comprises outward facing video camera 204 and inward facing video camera 206. For example, outward facing video camera 204 comprises a video camera facing the road ahead of the vehicle and inward facing video camera 206 comprises a video camera facing the driver. In various embodiments, vehicle event recorder system 200 additionally comprises a video camera facing the road behind the vehicle, a video camera facing out the left or right side of the vehicle, a video camera facing the passenger, etc. Vehicle event recorder system 200 additionally comprises sensors 208. Sensors 208 comprise audio recorders, accelerometers, gyroscopes, vehicle sensors, proximity sensors, outdoor temperature sensors, moisture sensors, laser line tracker sensors, SONAR, LIDAR, range finder sensors, etc. Vehicle sensors comprise internal vehicle sensors, for example a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder system 200 additionally comprises digital video recorder 210. Digital video recorder 210 comprises a digital video recorder for recording digital video data. For example, digital video recorder 210 comprises a large capacity digital storage device for recording as much digital video data and/or other sensor data as is desired—for example, continuous digital video data received from outward facing video camera 204, inward facing video camera 206, and/or any other appropriate video camera or cameras or any other appropriate sensor data, for a period of time comprising hours, days, weeks, etc. Vehicle event recorder user interface comprises an interface to vehicle event recorder system 200. For example, vehicle event recorder user interface 214 comprises one or more indicator lights for indicating digital video recorder (DVR) recording disabled or event detection disabled, a map display for showing a current map location, a current map region, a recording or event detection status, for receiving an indication of a map region, etc.

Figure 3:
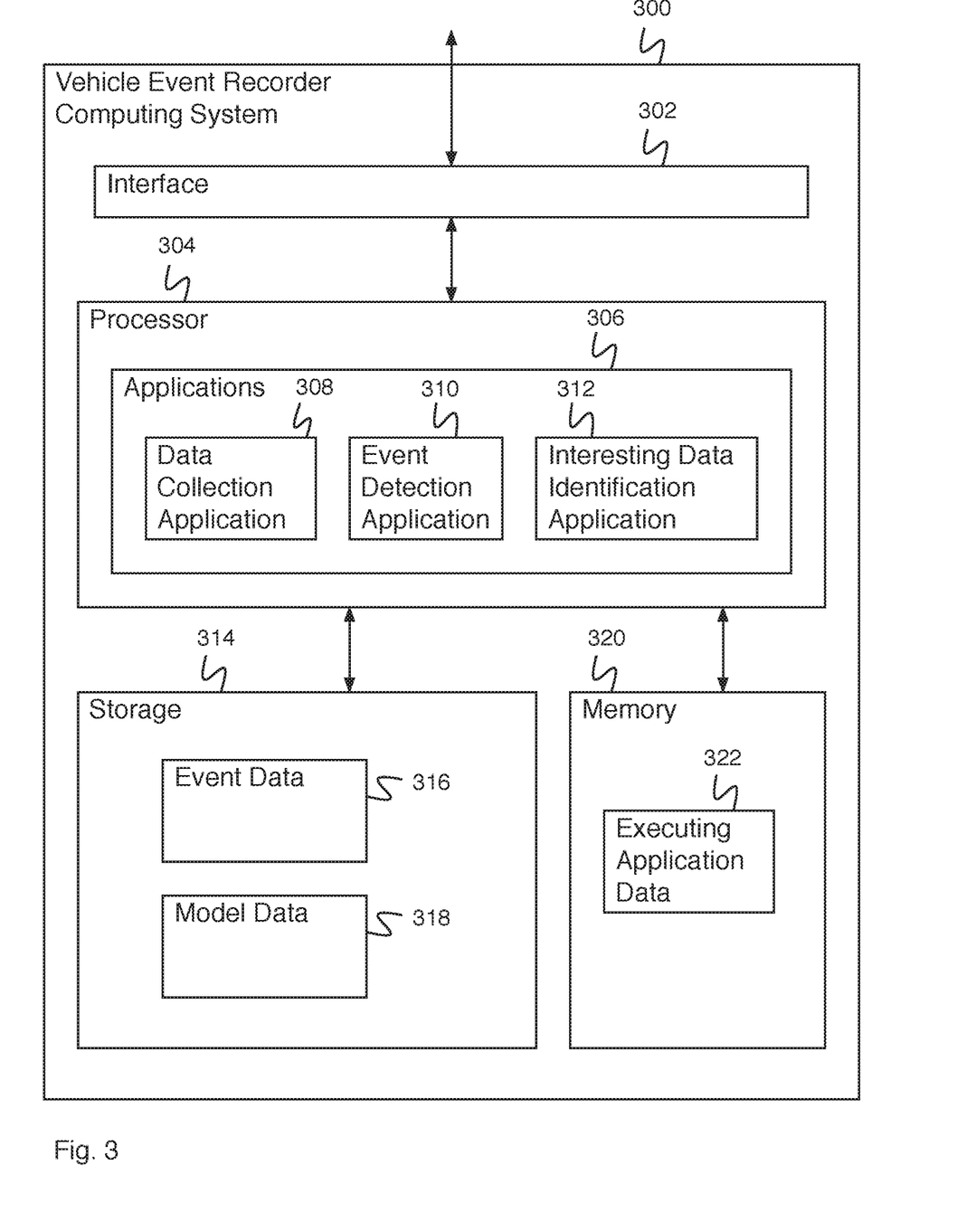
FIG. 3 is a block diagram illustrating an embodiment of a vehicle event recorder.

FIG. 3 is a block diagram illustrating an embodiment of a vehicle event recorder. In some embodiments, vehicle event recorder computing system 300 comprises vehicle event recorder computing system 212 of FIG. 2. In the example shown, vehicle event recorder computing system 300 comprises interface 302. Interface 302 comprises an interface for communicating with external systems using a network. For example, interface 302 comprises an interface for communicating with other elements of a vehicle recorder system (e.g., for receiving location data from a geolocation device, for receiving video data from an outward facing vehicle camera, for receiving sensor data, for providing an indication to enable or disable DVR storage, for communicating with a user interface, etc.), a vehicle data server (e.g., for providing sensor data, for providing indications of anomalous events), etc. Processor 304 comprises a processor for executing applications 306. Applications 306 comprise data collection application 308, event detection application 310, and interesting data identification application 312. Data collection application 308 comprises an application for collecting and storing sensor data (e.g., video data, audio data, accelerometer data, GPS data, etc.). In some embodiments, data collection application 308 stores data using a loop buffer (e.g., a data buffer wherein the record point moves through the buffer in a looping pattern). Event detection application 310 comprises an application for analyzing data and determining an occurrence of an anomalous event. In the event that event detection application 310 determines that an anomalous event has occurred, event data associated with the event is stored (e.g., only events are stored) or marked to be uploaded (e.g., events are stored for and transferred to a server) or marked in an index (e.g., events are always stored in a larger storage system and indexed for later review). Interesting data identification application 312 comprises an application for determining whether sensor data comprises interesting data (e.g., data associated with one or more interesting event types). For example, interesting data identification application 312 comprises an application for receiving a representative embedded vector and model data, creating a model using the model data, receiving sensor data, executing the model to generate a sensor data associated embedded vector, and determining whether the sensor data is associated with the interesting event type based at least in part on the sensor data associated vector. In some embodiments, processor 304 comprises other applications, including any other appropriate applications (e.g., a data collection application, a data viewing application, a driver health determination application, a data analysis application, etc.). Vehicle event recorder computing system 300 additionally comprises storage 314. Storage 314 comprises event data 316 and model data 318. Event data 316 comprises loop buffer data, sensor data, event data (e.g., an event time, an event location, sensor data indicating an event, an event magnitude, etc.), or any other appropriate data. Model data 318 comprises model data describing a model for identifying data associated with an interesting event type. In some embodiments, model data 318 additionally comprises one or more embedded vectors (e.g., one or more embedded vectors determined as the output of a model, one or more representative embedded vectors, etc.). Vehicle event recorder computing system 300 additionally comprises memory 320. Memory 320 comprises executing application data 322 comprising data associated with applications 306.

Figure 4:
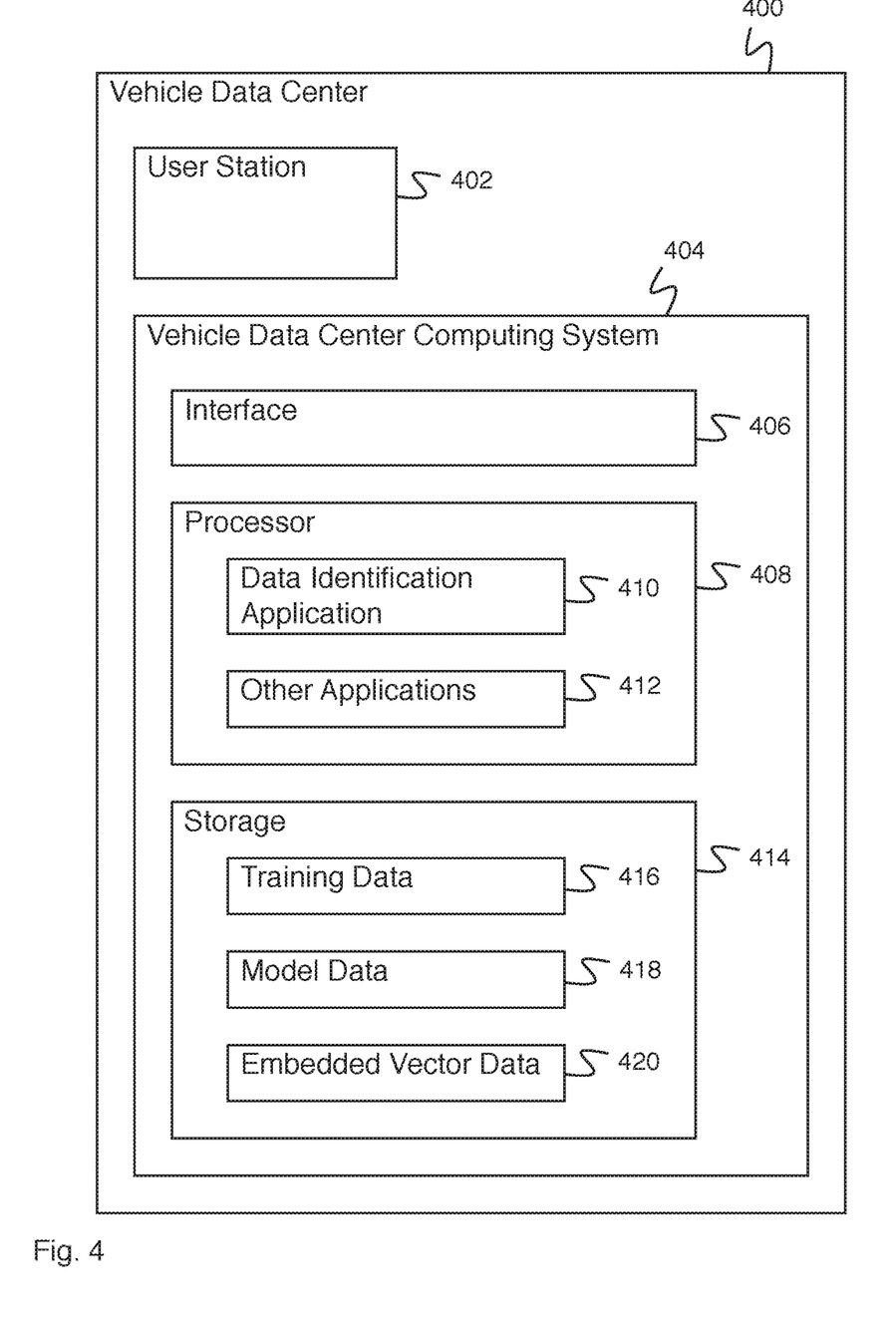
FIG. 4 is a block diagram illustrating an embodiment of a vehicle data center.

FIG. 4 is a block diagram illustrating an embodiment of a vehicle data center. In some embodiments, vehicle data center 400 comprises vehicle data center 104 of FIG. 1. In the example shown, vehicle data center 400 comprises user station 402 and vehicle data center computing system 404. For example, user station 402 comprises a user station for use by a user. A user uses user station 402 to view data, organize data, mark data as interesting, mark data as not interesting, request more data, etc. Vehicle data center computing system 404 comprises a computing system for data processing. For example, vehicle data center computing system 404 comprises a computing system for receiving data, storing data, processing data, requesting data, building a model, determining embedded vectors, etc. Vehicle data center computing system 404 comprises interface 406.

For example, interface 406 comprises an interface for receiving data, receiving a request for data, receiving an indication that data is interesting, receiving an indication that data is not interesting, providing model data, providing a representative embedded vector, etc. Processor 408 comprises a processor for executing applications. For example, processor 408 comprises a process for executing data identification application 410 and other applications 412. For example, data identification application 410 comprises an application for training a model to recognize interesting events associated with an interesting event type, determine embedded vectors associated with the interesting events, and determine a representative embedded vector associated with the interesting event type. Other applications 412 comprise any other appropriate applications (e.g., a communications application, a chat application, a web browser application, a document preparation application, a report preparation application, a user interface application, a data analysis application, etc.). Storage 414 comprises training data 416 (e.g., a set data samples including labels for whether each data sample is associated with one or more interesting event types), model data 418 (e.g., data describing a model for identifying data, e.g., for identifying whether data is associated with an interesting event type), and embedded vector data 420 (e.g., data describing one or more embedded vectors or representative embedded vectors, wherein embedded vectors comprise intermediate model data).

Figure 5:
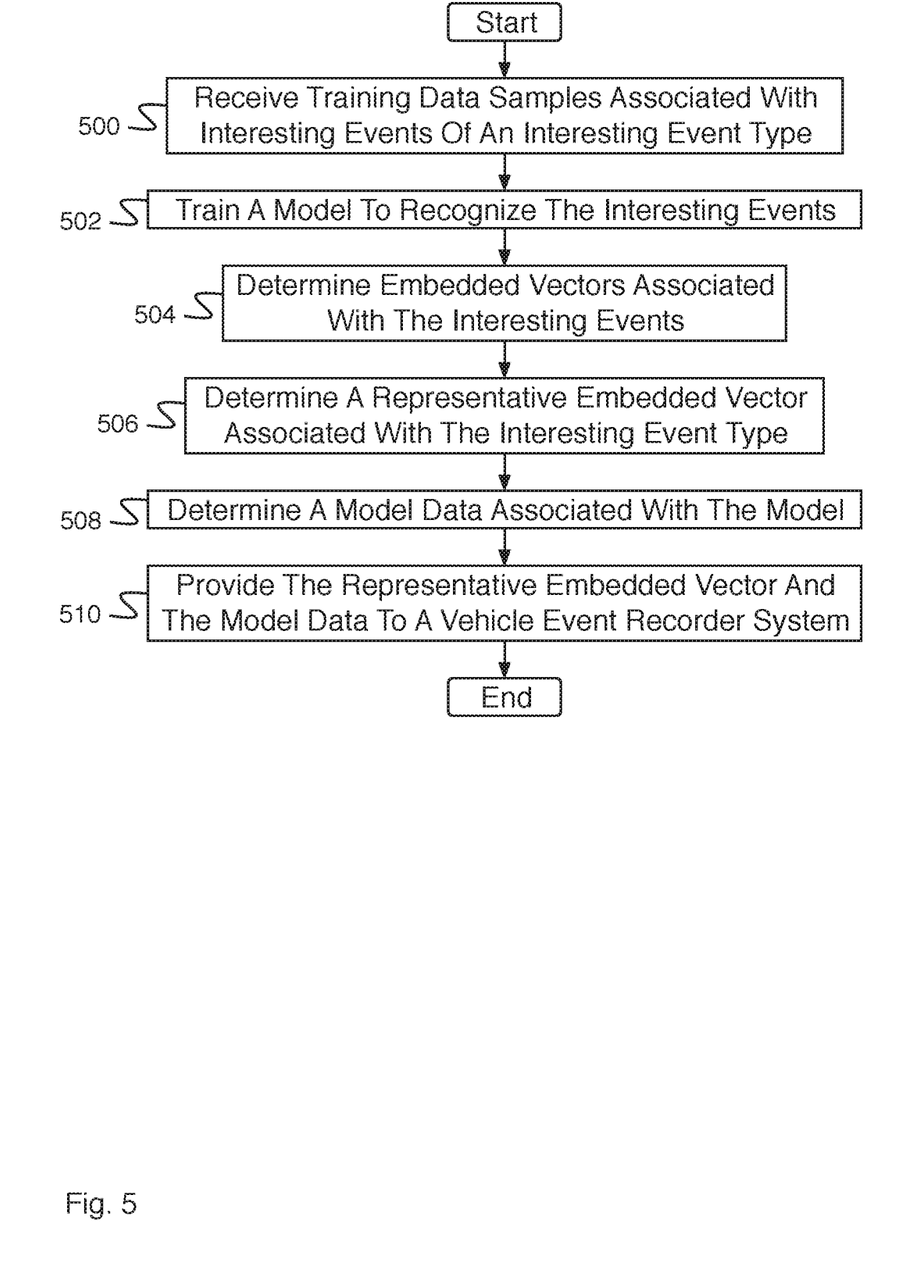
FIG. 5 is a flow diagram illustrating an embodiment of a process for identifying data.

FIG. 5 is a flow diagram illustrating an embodiment of a process for identifying data. In some embodiments, the process of FIG. 5 is executed by vehicle data center 104 of FIG. 1. In the example shown, in 500, training data samples associated with interesting events of an interesting event type are received. In 502, a model is trained to recognize the interesting events. In 504, embedded vectors associated with the interesting events are determined. For example, embedded vectors comprise intermediate outputs of the model (e.g., outputs of a first layer of the model, outputs of a second layer of the model, etc.) in response to data samples identified as associated with the interesting event type. In 506, a representative embedded vector associated with the interesting event type is determined. For example, determining a representative embedded vector comprises determining a representative embedded vector from a set of embedded vectors (e.g., by determining an average of the embedded vectors, determining a weighted average of the embedded vectors, determining the result of a clustering operation on the embedded vectors, etc.). In 508, a model data is determined. For example, the model data comprises data describing the model (e.g., data sufficient to rebuild the model, e.g., model parameter data, model weight data, model layer data, etc.). In some embodiments, the model data comprises data describing only a portion of the model (e.g., a first layer of the model, a first two layers of the model, only the portion of the model used to create the embedded vectors, etc.). In some embodiments, the model data comprises the model or a portion of the model. In 510 the representative embedded vector and the model data are provided to a vehicle event recorder system. In some embodiments, the representative embedded vector and the model data are provided to a plurality of vehicle event recorder systems.

Figure 6:
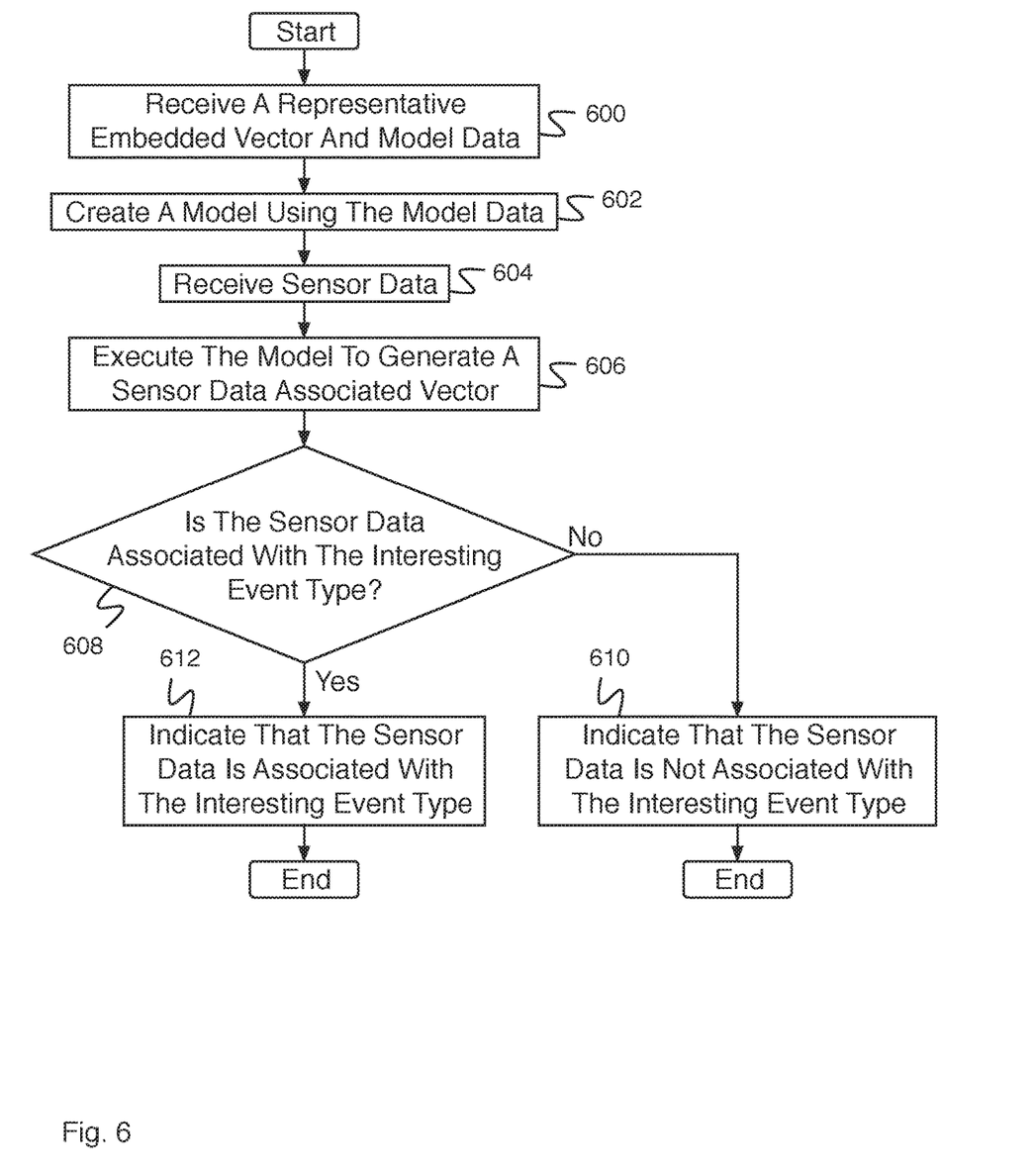
FIG. 6 is a flow diagram illustrating an embodiment of a process for identifying data on a vehicle event recorder.

FIG. 6 is a flow diagram illustrating an embodiment of a process for identifying data on a vehicle event recorder. In some embodiments, the process of FIG. 6 is executed by vehicle event recorder system 102 of FIG. 1. In the example shown, in 600, a representative embedded vector and model data are received. For example, a representative embedded vector and model data are received from a vehicle data center (e.g., vehicle data center 104 of FIG. 1). In 602, a model is created using the model data (e.g., a model determined by the vehicle data center is rebuilt using the model data). In some embodiments, only a portion of a model is created using the model data. In 604, sensor data is received. For example, sensor data comprises video data, forward facing video data, inward facing video data, rearward facing video data, side facing video data, audio data, acceleration data, GPS data, LIDAR data, or SONAR data. In 606, the model is executed to generate a sensor data associated vector. In some embodiments, only a portion of the model is executed. For example, a first layer of the model is executed, a first two layers of the model are executed, a first set of layers of the model are executed, etc. In 608, it is determined whether the sensor data is associated with the interesting event type. For example, determining whether the sensor data is associated with the interesting event type is based at least in part on the sensor data associated vector. In some embodiments, determining whether the sensor data is associated with the interesting event type comprises determining a distance between the sensor data associated vector and the representative embedded vector (e.g., using a machine learning model, by analyzing the sensor data associated embedded vector using a neural network trained on the representative embedded vector, by determining a vector distance between the sensor data associated embedded vector and the representative embedded vector, etc.) and determining whether the distance is less than a threshold distance. In response to determining that the sensor data is associated with the interesting event type, in 612 it is indicated that the sensor data is associated with the interesting event type, and the process ends. In response to determining that the sensor data is not associated with the interesting event type, in 610 it is indicated that the sensor data is not associated with the interesting event type, and the process ends.

Figure 7:
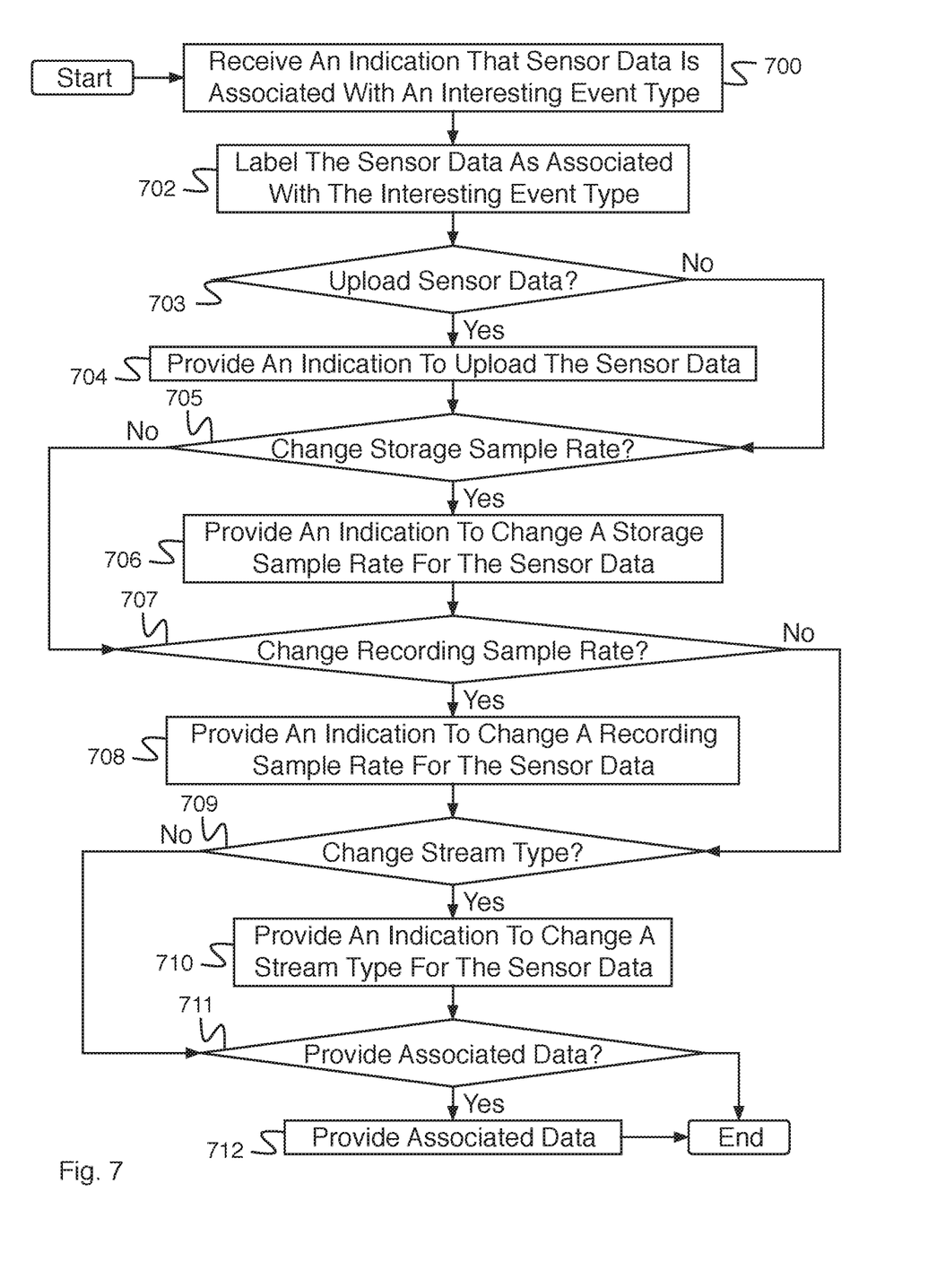
FIG. 7 is a flow diagram illustrating an embodiment of a process for responding to a determination.

FIG. 7 is a flow diagram illustrating an embodiment of a process for responding to a determination. In some embodiments, the process of FIG. 7 is executed by vehicle event recorder system 102 of FIG. 1 for responding to a determination of whether sensor data is associated with an interesting event type. In the example shown, in 700, an indication is received that sensor data is associated with an interesting event type. For example, the indication of 612 of FIG. 6 is received. In 702, the sensor data is labeled as associated with the interesting event type. In 703, it is determined whether sensor data is to be uploaded. In response to determining that sensor data is to be uploaded, control passes to 704. In response to determining that sensor data is not to be uploaded, control passes to 705. In 704, an indication is provided to upload the sensor data, and control passes to 705.

In 705, it is determined whether a storage sample rate is to be changed. In response to determining that a storage sample rate is to be changed, control passes to 706. In response to determining that a storage sample rate is not to be changed, control passes to 707. In 706, an indication is provided to change a storage sample rate for the sensor data, and control passes to 707.

In 707, it is determined whether a recording sample rate is to be changed. In response to determining that a recording sample rate is to be changed, control passes to 708. In response to determining that a recording sample rate is not to be changed, control passes to 709. In 708, an indication is provided to change a recording sample rate for the sensor data, and control passes to 709.

In 709, it is determined whether a stream type is to be changed. In response to determining that a stream type is to be changed, control passes to 710. In response to determining that a stream type is not to be changed, control passes to 711. In 710, an indication is provided to change a stream type for the sensor data, and control passes to 711. For example, changing a stream type comprises adding audio to a video stream, adding video to an audio stream, adding accelerometer data to a GPS data stream, increasing a stream data rate, decreasing a stream data rate, or changing a stream type in any other appropriate way.

In 711, it is determined whether associated data is to be provided. In response to determining that associated data is to be provided, control passes to 712. In response to determining that associated data is not to be provided, the process ends. In 712, associated data is provided, and the process ends. For example, in response to receiving an indication of sensor data associated with an interesting event type, the system may want to add data from another sensor, adjust other sensors, acquire or indicate to acquire data from other vehicle event recorders, or any other appropriate action. In some embodiments, associated data comprises higher data rate data, other sensor data, sensor data from a different time, sensor data from a different location, sensor data from a different vehicle event recorder, or any other appropriate associated data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for identifying data, comprising:
an interface configured to:
receive training data samples associated with interesting events of an interesting event type;
a processor configured to:
train a model to recognize the interesting events;
determine embedded vectors associated with the interesting events; and
determine a representative embedded vector associated with the interesting event type;
a vehicle event recorder interface configured to:
receive sensor data, wherein the sensor data comprises one or more of the following: video data, forward facing video data, inward facing video data, rearward facing video data, side facing video data, audio data, acceleration data, GPS data, LIDAR data, and/or SONAR data; and
receive the representative embedded vector and model data; and
a vehicle event recorder processor configured to:
create the model using the model data;
execute the model to generate a sensor data associated embedded vector; and
determine whether the sensor data is associated with the interesting event type based at least in part on the sensor data associated embedded vector, comprising to:
determine a vector distance between the sensor data associated embedded vector and the representative embedded vector using a machine learning model;
compare the vector distance with a vector distance threshold; and
in response to a determination that the vector distance is less than or equal to the vector distance threshold, determine that the sensor data is associated with the interesting event type.

2. The system of claim 1, wherein the embedded vectors comprise intermediate outputs of the model.

3. The system of claim 1, wherein determining a representative embedded vector comprises determining an average of the embedded vectors, determining a weighted average of the embedded vectors, or determining a result of a clustering operation on the embedded vectors.

4. The system of claim 1 wherein determining whether the sensor data is associated with the interesting event type based at least in part on the sensor data associated embedded vector comprises analyzing the sensor data associated embedded vector using a neural network trained on the representative embedded vector.

5. The system of claim 1 wherein executing the model comprises executing only a portion of the model.

6. The system of claim 5, wherein the portion of the model comprises a first layer or a first set of layers.

7. The system of claim 1 wherein the vehicle event recorder processor is further configured to:
in response to determining that the sensor data is associated with the interesting event type:
provide an indication to upload the sensor data.

8. The system of claim 1 wherein the vehicle event recorder processor is further configured to:
in response to determining that the sensor data associated embedded vector is associated with the interesting event type:
provide an indication to change a storage sample rate for the sensor data.

9. The system of claim 1 wherein the vehicle event recorder processor is further configured to:
in response to determining that the sensor data associated embedded vector is associated with the interesting event type:
provide an indication to change a recording sample rate for the sensor data.

10. The system of claim 1 wherein the vehicle event recorder processor is further configured to:
in response to determining that the sensor data associated embedded vector is associated with the interesting event type:
provide an indication to change a stream type for the sensor data.

11. The system of claim 10, wherein changing the stream type comprises adding audio to a video stream, adding video to an audio stream, adding accelerometer data to a GPS data stream, increasing a stream data rate, or decreasing the stream data rate.

12. The system of claim 1 wherein the vehicle event recorder processor is further configured to:
in response to determining that the sensor data associated embedded vector is associated with the interesting event type:
provide associated data.

13. The system of claim 12, wherein associated data comprises higher data rate data, other sensor data, sensor data from a different time, sensor data from a different location, or sensor data from a different vehicle event recorder.

14. A method for identifying data, comprising:
receiving training data samples associated with interesting events of an interesting event type;
training, using a processor, a model to recognize the interesting events;
determining embedded vectors associated with the interesting events; determining a representative embedded vector associated with the interesting event type;
receiving sensor data, wherein the sensor data comprises one or more of the following:
video data, forward facing video data, inward facing video data, rearward facing video data, side facing video data, audio data, acceleration data, GPS data, LIDAR data, and/or SONAR data;
receiving the representative embedded vector and model data;
creating the model using the model data;
executing the model to generate a sensor data associated embedded vector;
determining whether the sensor data is associated with the interesting event type based at least in part on the sensor data associated embedded vector, comprising:
determining a vector distance between the sensor data associated embedded vector and the representative embedded vector using a machine learning model;
comparing the vector distance with a vector distance threshold; and
in response to a determination that the vector distance is less than or equal to the vector distance threshold, determining that the sensor data is associated with the interesting event type.

15. A computer program product for identifying data, the computer program product being embodied in a non-transitory computer readable storage medium and comprising computer instructions for:
receiving training data samples associated with interesting events of an interesting event type;

training a model to recognize the interesting events;
determining embedded vectors associated with the interesting events;
determining a representative embedded vector associated with the interesting event type;
receiving sensor data, wherein the sensor data comprises one or more of the following: video data, forward facing video data, inward facing video data, rearward facing video data, side facing video data, audio data, acceleration data, GPS data, LIDAR data, and/or SONAR data;
receiving the representative embedded vector and model data;
creating the model using the model data;
executing the model to generate a sensor data associated embedded vector;
determining whether the sensor data is associated with the interesting event type based at least in part on the sensor data associated embedded vector, comprising:
  determining a vector distance between the sensor data associated embedded vector and the representative embedded vector using a machine learning model;
  comparing the vector distance with a vector distance threshold; and
  in response to a determination that the vector distance is less than or equal to the vector distance threshold, determining that the sensor data is associated with the interesting event type.

* * * * *

UNITED STATES PATENT AND TRADEMARK OFFICE
CERTIFICATE OF CORRECTION

| | |
|---|---|
| PATENT NO. | : 11,615,654 B1 |
| APPLICATION NO. | : 16/663152 |
| DATED | : March 28, 2023 |
| INVENTOR(S) | : Stephen Krotosky, Jeremiah Todd Wittevrongel and Jesse Daniels |

It is certified that error appears in the above-identified patent and that said Letters Patent is hereby corrected as shown below:

In the Claims

In Column 9, Line(s) 46, Claim 4, after "claim 1", insert --,--.

In Column 9, Line(s) 52, Claim 5, after "claim 1", insert --,--.

In Column 9, Line(s) 56, Claim 7, after "claim 1", insert --,--.

In Column 9, Line(s) 61, Claim 8, after "claim 1", insert --,--.

In Column 10, Line(s) 1, Claim 9, after "claim 1", insert --,--.

In Column 10, Line(s) 8, Claim 10, after "claim 1", insert --,--.

In Column 10, Line(s) 20, Claim 12, after "claim 1", insert --,--.

Signed and Sealed this
Eighth Day of August, 2023

Katherine Kelly Vidal
*Director of the United States Patent and Trademark Office*